US012375871B2

(12) United States Patent
Uyar et al.

(10) Patent No.: US 12,375,871 B2
(45) Date of Patent: Jul. 29, 2025

(54) METHOD FOR CONTROLLING A SWARM OF UNMANNED AUTONOMOUS ENTITIES FOR GEOLOCATION OF A SOURCE

(71) Applicant: United States Government, as represented by the Secretary of the Army, Aberdeen Proving Ground, MD (US)

(72) Inventors: Muharrem Umit Uyar, Holmdel, NJ (US); Janusz Kusyk, Kew Gardens, NY (US); Jeffrey Boksiner, Cockeysville, MD (US); Giorgio Bertoli, Bel Air, MD (US); Sagor Hoque, New Castle, DE (US); Joseph Plishka, Stewartstown, PA (US)

(73) Assignee: The Government of the United States, represented by the Secretary of the Army

( * ) Notice: Subject to any disclaimer, the term of this patent is extended or adjusted under 35 U.S.C. 154(b) by 450 days.

(21) Appl. No.: 17/947,685

(22) Filed: Sep. 19, 2022

(65) Prior Publication Data
US 2023/0089475 A1 Mar. 23, 2023

Related U.S. Application Data

(60) Provisional application No. 63/245,551, filed on Sep. 17, 2021.

(51) Int. Cl.
*H04W 4/021* (2018.01)
*G05D 1/00* (2024.01)
*G06N 3/126* (2023.01)
*H04B 17/318* (2015.01)
*H04W 4/02* (2018.01)
*H04W 4/40* (2018.01)

(52) U.S. Cl.
CPC .......... *H04W 4/021* (2013.01); *G05D 1/0027* (2013.01); *G06N 3/126* (2013.01); *H04B 17/318* (2015.01); *H04W 4/023* (2013.01); *H04W 4/40* (2018.02)

(58) Field of Classification Search
None
See application file for complete search history.

(56) References Cited

U.S. PATENT DOCUMENTS

| 9,537,954 | B2 | | 1/2017 | Ranasinghe et al. | |
|---|---|---|---|---|---|
| 11,104,436 | B2 | * | 8/2021 | Ghio | B64U 80/25 |
| 11,794,931 | B2 | * | 10/2023 | Gil | B64U 10/25 |
| 2004/0068415 | A1 | | 4/2004 | Solomon | |

(Continued)

FOREIGN PATENT DOCUMENTS

| CN | 109254588 A | * | 1/2019 | .......... G05D 1/0808 |
|---|---|---|---|---|
| KR | 102263307 B1 | | 6/2021 | |
| WO | WO2019157545 A1 | | 8/2019 | |

*Primary Examiner* — Adolf Dsouza
(74) *Attorney, Agent, or Firm* — Kirsten Hiera

(57) ABSTRACT

A method that pertains to location of an emitter source is provided. The method can use game theory and an estimation method. The method can use an autonomous entity that can operate independently of an external controlling entity, and independently of any other autonomous entity in a swarm of autonomous entities. A system comprising a swarm of autonomous entities and a control unit that can implement the method is provided.

20 Claims, 11 Drawing Sheets

(56) References Cited

U.S. PATENT DOCUMENTS

| | | | |
|---|---|---|---|
| 2016/0147973 A1* | 5/2016 | Holcomb | G16H 50/50 |
| | | | 703/2 |
| 2019/0033893 A1 | 1/2019 | Duan et al. | |
| 2019/0227540 A1 | 7/2019 | Suvite | |
| 2020/0140087 A1* | 5/2020 | Fulbright | A62C 3/0235 |
| 2020/0043348 A1 | 6/2020 | Ghosh et al. | |

* cited by examiner

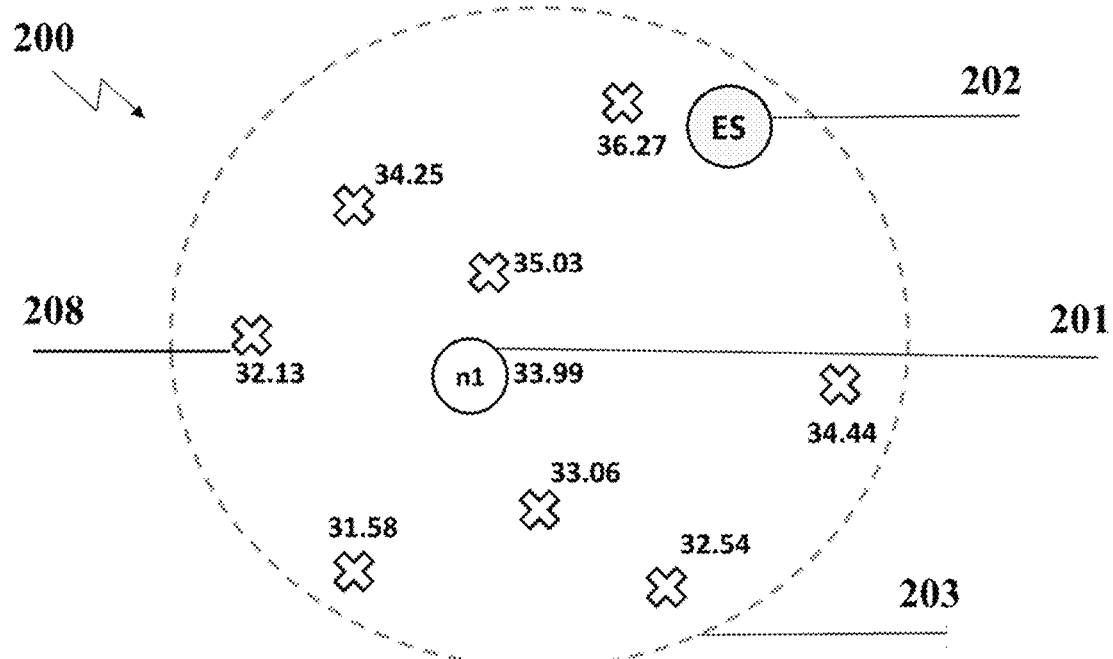
FIG. 2.a

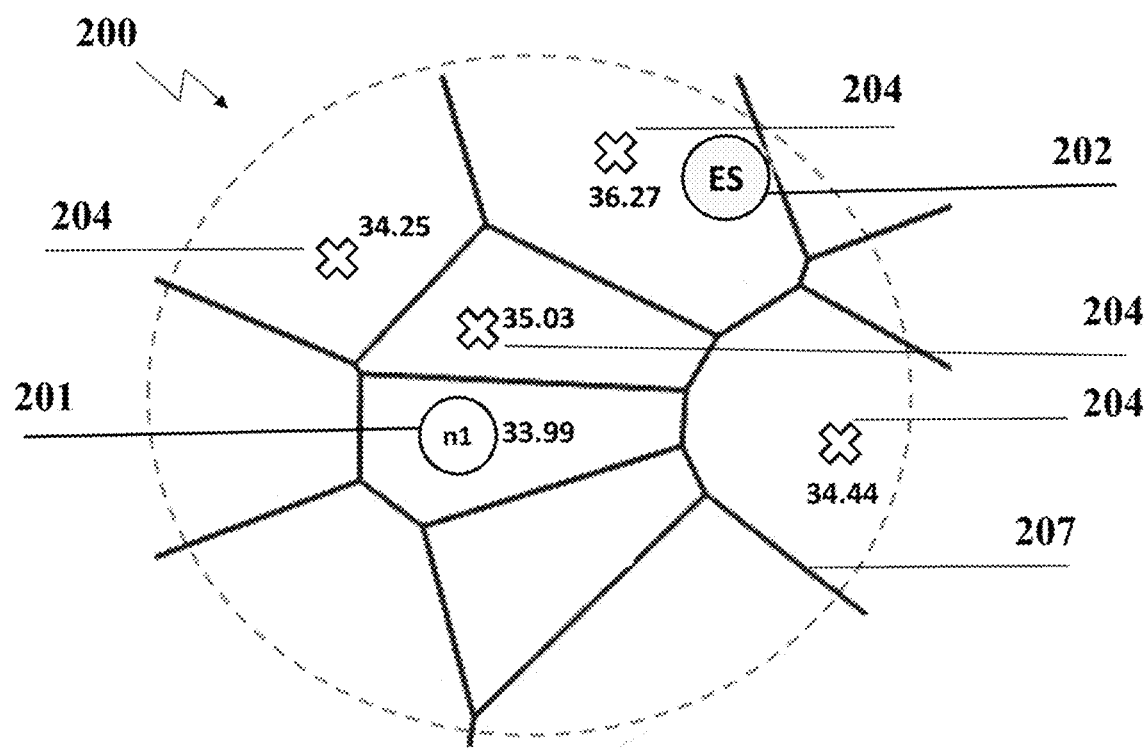
FIG. 2.b

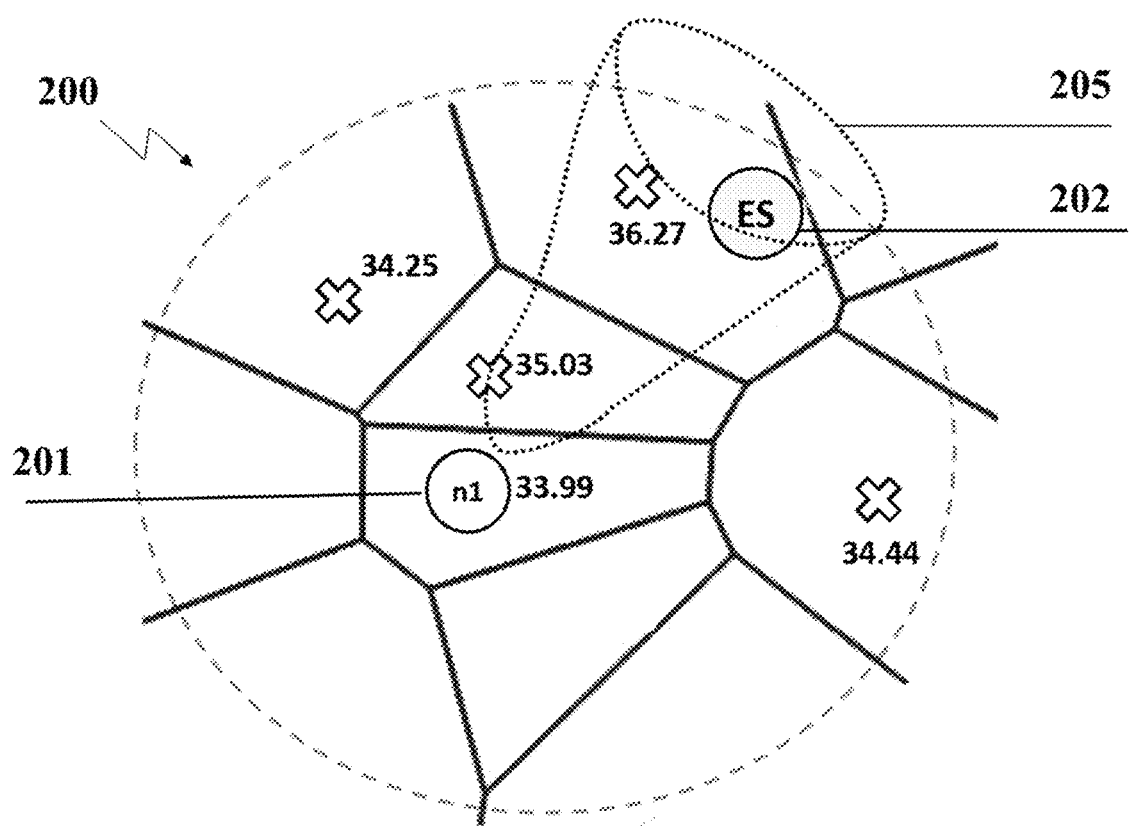
FIG. 2.c

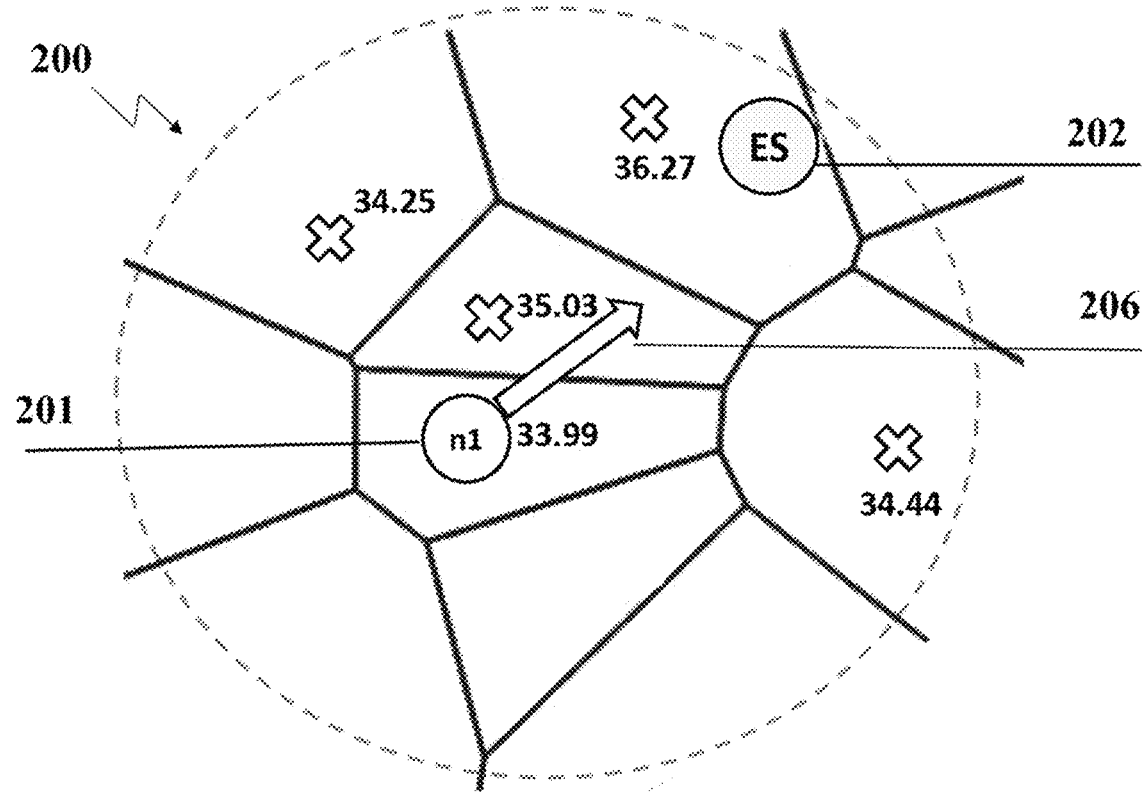
FIG. 2.d

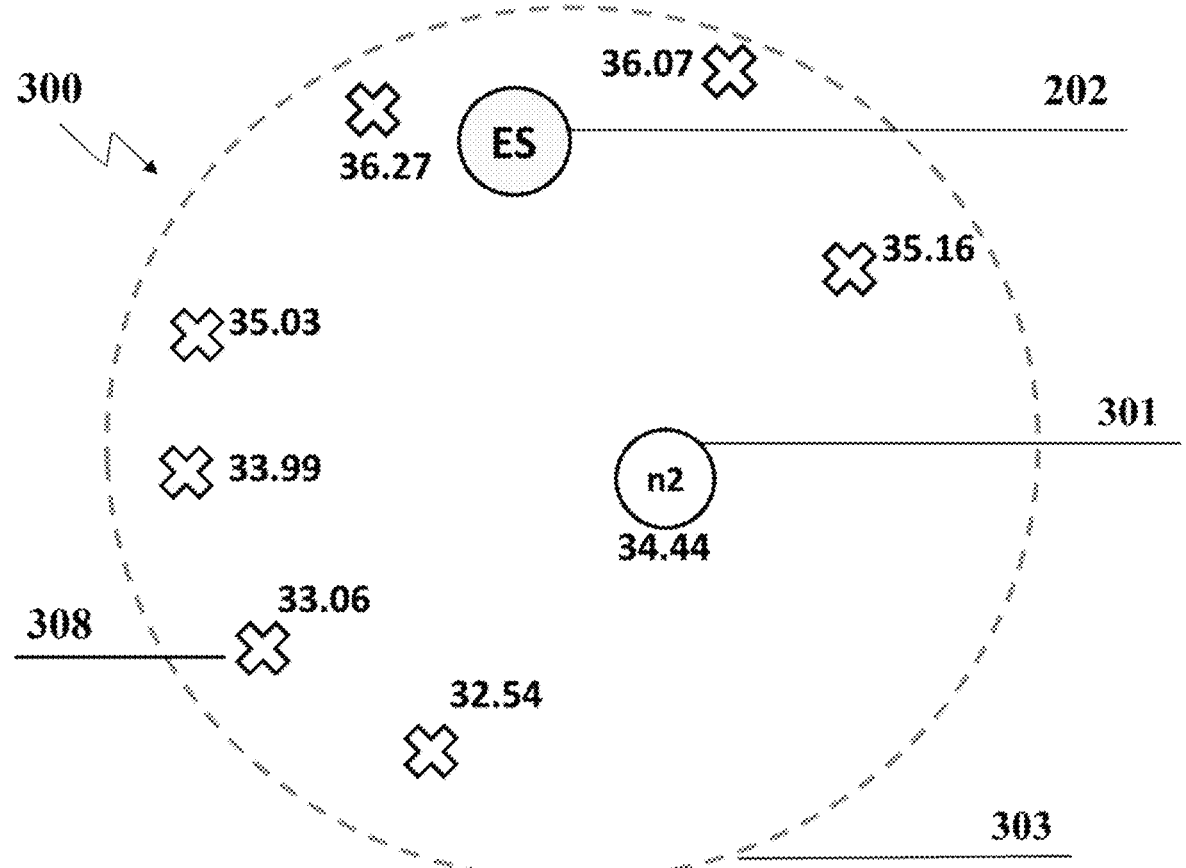
FIG. 3.a

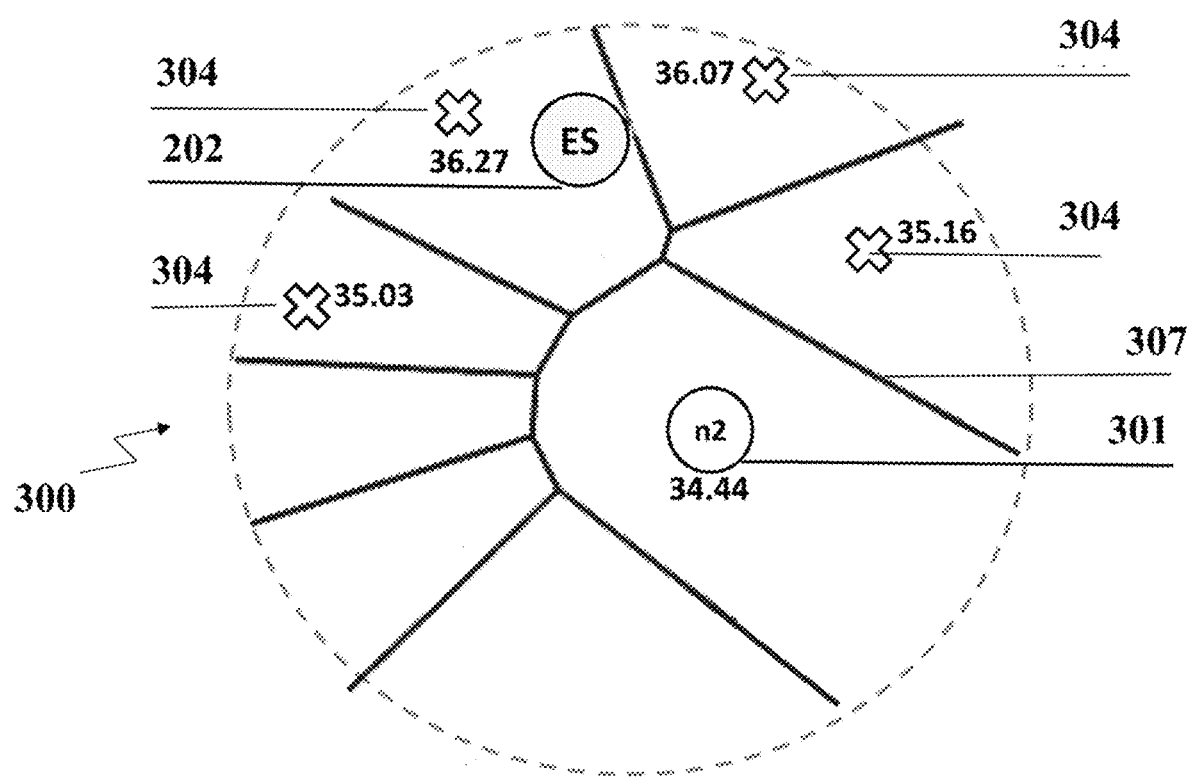
FIG. 3.b

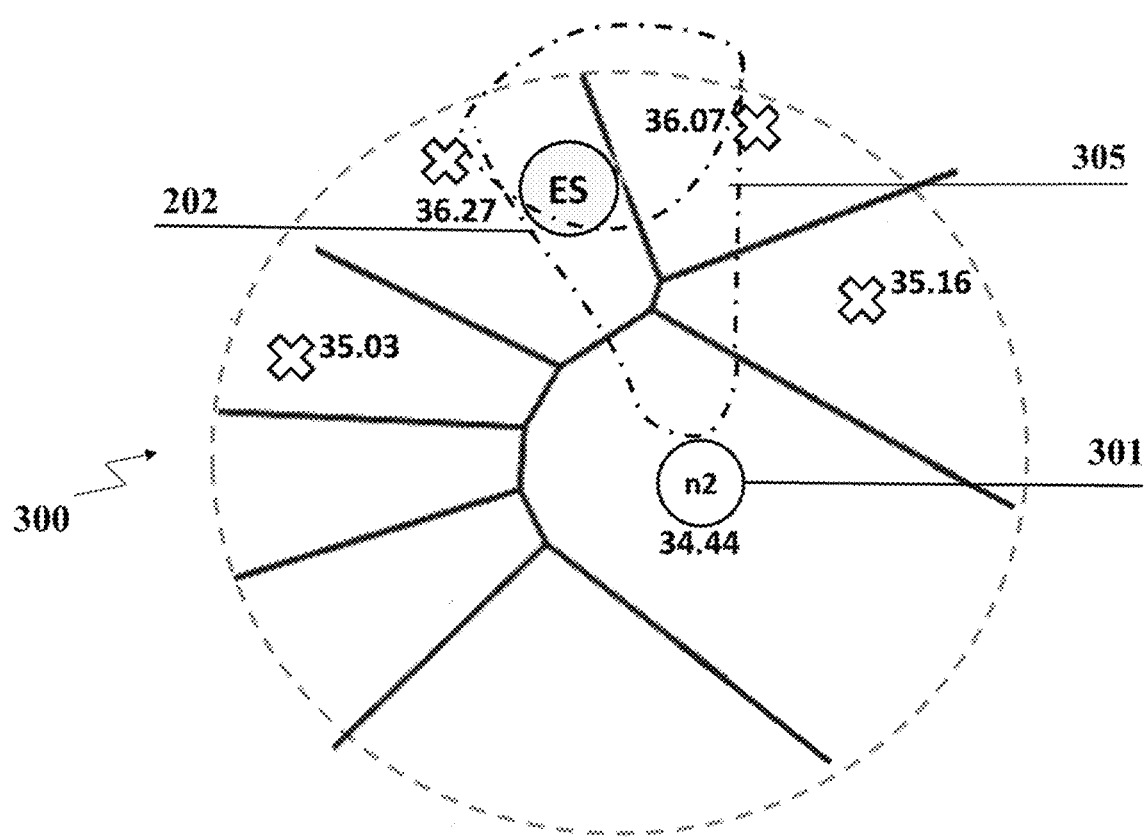
FIG. 3.c

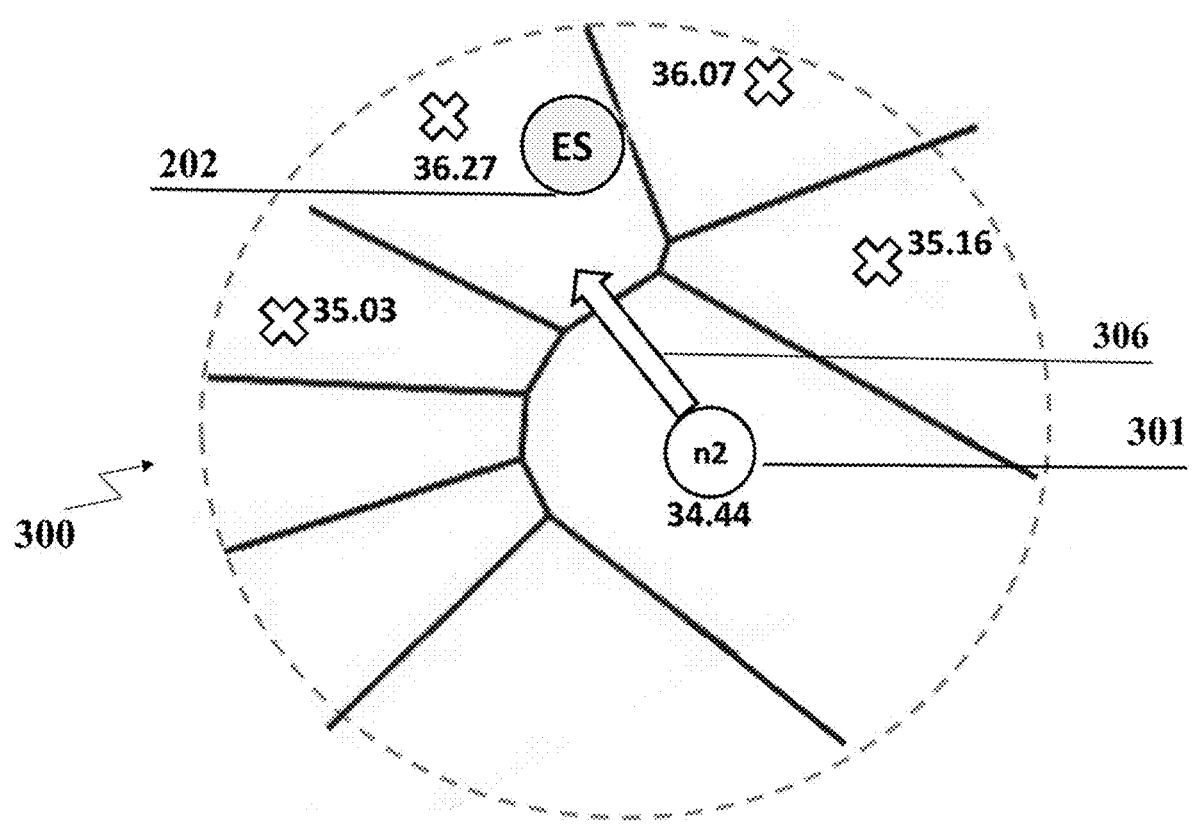
FIG. 3.d

METHOD FOR CONTROLLING A SWARM OF UNMANNED AUTONOMOUS ENTITIES FOR GEOLOCATION OF A SOURCE

CROSS-REFERENCE

This application claims priority to U.S. Application No. 63/245,551 filed on Sep. 17, 2021. U.S. Application No. 63/245,551 is hereby incorporated by reference.

GOVERNMENT INTEREST

The innovation described herein may be manufactured, used, imported, sold, and licensed by or for the Government of the United States of America without the payment of any royalty thereon or therefor.

FIELD OF THE INVENTION

The present disclosure relates in general to the fields of electrical engineering, computer engineering, computer science, artificial intelligence, game theory and topographic sciences. In particular, this invention relates to geo-location of emitter sources by a swarm of autonomous entities.

BACKGROUND

Voronoi tessellations is a method for dividing a space into regions, where each region is identified as having borders equidistant from its centroid. In a conventional method to identify the location of an acoustic source, all sensors in a computer network are connected to each other to share all sensed information and to generate a Voronoi tessellation of the entire area. The Voronoi cell with the strongest reading is identified as the leader to pinpoint the location of the acoustic source. Conventional methods may require synchronization among sensors and global coordination among all entities in a swarm when generating Voronoi tessellations.

Conventional methods such as the aforementioned method are problematic for various reasons. Collecting all sensory information from all nodes significantly decreases computational speed and is not suitable for mobile and dynamically changing swarm operational conditions where dozens or even hundreds of entities may be operating as a swarm. Additionally, the leader selection process requires significant communication overhead. Whenever nodes or emitter source(s) move, a new leader must be selected since node positions will change with respect to the emitter source, making the computational overhead even worse. Moreover, election of a leader is not a fault tolerant solution. If the leader becomes disabled, all results related to the computation are lost. Crowding of entities in a swarm can also be of concern, resulting in lesser area coverage.

For the foregoing reasons, there is a need in the art for methods and systems for geolocation of a source, where there is no leader or other entity that controls or directs members of a swarm, and where members of a swarm act independently or in a non-synchronized manner.

SUMMARY

The present disclosure resolves the aforementioned problems with controlling a swarm of entities using a central controller entity, requiring synchronization among units, requiring a pre-planned set of rules to determine where to move, and operating using global communication among units. The present disclosure also resolves problems with crowding of swarm entities.

In one embodiment, a method can comprise sending a first message from an autonomous entity to a first group of near neighbors of the autonomous entity. The autonomous entity can be a member of a swarm of autonomous entities. The first message can comprise a first piece of sensory information. The method can also comprise receiving, by the autonomous entity, a second message from a near neighbor that is a member of a second group of near neighbors of the autonomous entity. The second message can comprise a second piece of sensory information. The method can also comprise determining whether the near neighbor that is a member of the second group of near neighbors, is a near neighbor that is useful in computing an estimated location of an emitter source. This can be accomplished using game theory. The method can also comprise identifying an estimated location of the emitter source. This can be accomplished by using at least the first piece of sensory information and a second piece of sensory information from the near neighbor that is useful in computing an estimated location of the emitter source. This can be accomplished based on game theory. This can be accomplished based on an estimation method.

In another embodiment, a non-transitory computer-readable storage medium can be configured for store a program. The program can perform the aforementioned method. In yet another embodiment, a system that can comprise a swarm of autonomous entities and a control unit that can perform the aforementioned method is disclosed.

BRIEF DESCRIPTION OF THE DRAWINGS

The accompanying drawings, which are included to provide further understanding of the present disclosure, and are incorporated in and constitute a part of the specification, illustrate exemplary embodiments of the present disclosure, and together with the description server to explain the principles of the present disclosure. The present disclosure will now be described further with reference to the accompanying drawings as follows:

FIG. 2.$a$ is an example conceptual diagram of an autonomous entity n1 with its near neighbors.

FIG. 2.$b$ is an example conceptual diagram of an autonomous entity n1 selecting some of its near neighbors as players based on game theory.

FIG. 2.$c$ is an example conceptual diagram of an autonomous entity n1 computing a three dimensional volume estimate of emitter source position.

FIG. 2.$d$ is an example conceptual diagram of an autonomous entity n1 computing where to move based on a bio-inspired algorithm.

FIG. 3.$a$ is an example conceptual diagram of an autonomous entity n2 with its near neighbors.

FIG. 3.$b$ is an example conceptual diagram of an autonomous entity n2 selecting some of its near neighbors as players based on game theory.

FIG. 3.$d$ is an example conceptual diagram of an autonomous entity n2 computing where to move based on a bio-inspired algorithm.

DETAILED DESCRIPTION

Figure 1:
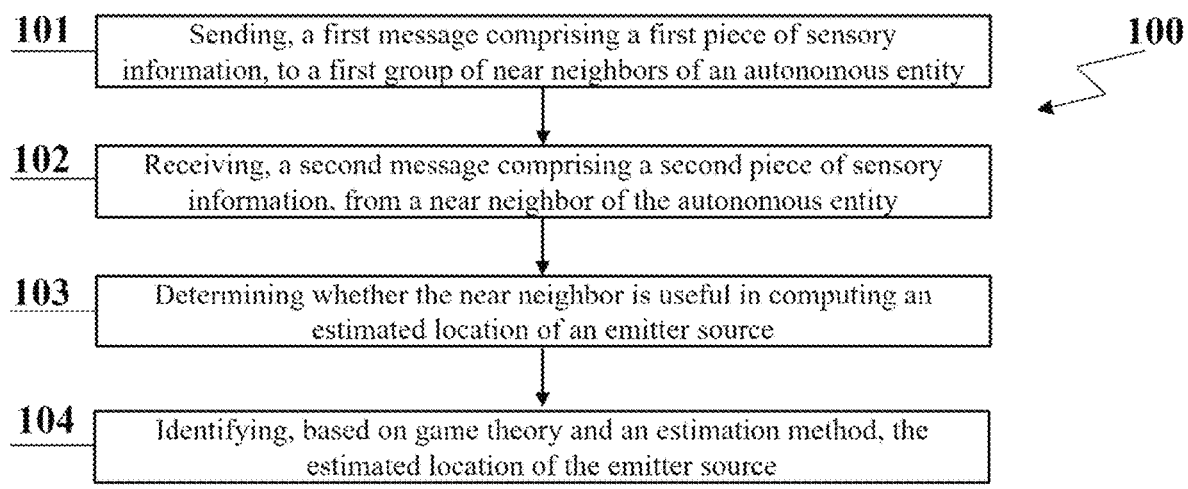
FIG. 1 illustrates a method comprising four actions.

FIG. 1 illustrates one embodiment of a method 100 comprising four actions 101-104. These actions can be performed by an autonomous entity. The autonomous entity can be a member of a swarm of autonomous entities. At 101, a first message can be sent from an autonomous entity to a first group of near neighbors of the autonomous entity (e.g., a group of entities that is within a communication range (e.g., a local communication range) of the autonomous entity. The first message can comprise a first piece of sensory information. In one embodiment, the first message can be sent at a periodic interval of time. For example, the first message can be sent every half second. In one embodiment, the first message can be sent in a single instance. In one embodiment, the first message can be sent at various intervals of time (e.g., irregularly or haphazardly). In the embodiment where the first message can be sent at various intervals of time, the first message can change as the first piece of sensory information can change over time. For example, as the autonomous entity moves as time passes, a signal strength of the autonomous entity can change.

The first piece of sensory information can comprise at least one of a current location of the autonomous entity, a first signal strength of the emitter source, and an estimated direction of the emitter source with respect to the autonomous entity. The first piece of sensory information can comprise at least one of an amount of heat, a frequency of an electromagnetic wave, a strength of an acoustic signal, a concentration of gas, a concentration of a liquid, and/or a visual indicator (e.g., an intensity of light). The autonomous entity can perform the sending step 101 independently of any external controlling entity (e.g., a leader that is a member of the swarm or an external member that is not a member of the swarm) and independently of any other autonomous entity in the swarm.

At 102, a second message can be received by the autonomous entity. The second message can be from a near neighbor (e.g., an entity that is within a communication range (e.g., a local communication range) of the autonomous entity). The near neighbor can be a member of a second group of near neighbors of the autonomous entity. The second message can comprise a second piece of sensory information. The second message can be sent at a periodic interval of time. For example, a second message can be sent every second. The second message can be sent at a periodic interval of time that is the same as the periodic interval of time that the first message is sent. Using the example above, the second message can be sent every half second. The second message can be sent at a periodic interval of time that is different from the periodic interval of time that the first message is sent. For example, the second message can be sent every second. In one embodiment, the second message can be sent in a single instance. In one embodiment, the second message can be sent at various intervals of time (e.g., irregularly or haphazardly). In this embodiment where the second message can be sent at various intervals of time, the second message can change as the second piece of sensory information can change over time. For example, as the second near neighbor moves as time passes, a signal strength of the second near neighbor can change.

The second piece of sensory information can comprise at least one of a current location of the second near neighbor of the autonomous entity, a second signal strength of the emitter source, and an estimated direction of the emitter source with respect to the second near neighbor. The second piece of sensory information can comprise at least one of an amount of heat, a frequency of an electromagnetic wave, a strength of an acoustic signal, a concentration of gas, a concentration of a liquid, and/or a visual indicator (e.g., an intensity of light). The second near neighbor can be the near neighbor that is the member of the second group of near neighbors of the autonomous entity. The autonomous entity can perform the receiving step 102 independently of any external controlling entity (e.g., a leader that is a member of the swarm or an external member that is not a member of the swarm) and independently of any other autonomous entity in the swarm.

At 103, a determination on whether the near neighbor that is a member of the second group of near neighbors, is a near neighbor that is useful in computing an estimated location of an emitter source, can be performed. The determination can be performed using game theory. Game theory is a framework for analyzing behavior of rational competitors in strategic situations, where outcomes depend on actions of all players. Game theory is a specific area of applied mathematics whose scope encompasses a broad set of analytical techniques for real-life problems in economics, business, planning, engineering, science and others. Popular applications of game theory in telecommunication networks attempt to design efficient routing protocols with enhanced security and improved spectrum sharing. The autonomous entity can be a first player. The autonomous entity can perform the determination 103 of whether the near neighbor that is a member of the second group of near neighbors is a near neighbor that is useful, independently of any external (e.g., a leader that is a member of the swarm or an external member that is not a member of the swarm) controlling entity and independently of any other autonomous entity in the swarm.

At 104, an estimated location of the emitter source can be identified, using at least the first piece of sensory information and a second piece of sensory information from the near neighbor that is useful in computing an estimated location of the emitter source. This can be accomplished using game theory and an estimation method. Suitable estimation methods include, but are not limited to, Voronoi tessellations, heatmap computations, and eigenspace computations. The estimated location of the emitter source can be a two dimensional plane or a three dimensional volume. The autonomous entity can perform the identification step independently of any external controlling entity (e.g., a leader that is a member of the swarm or an external member that is not a member of the swarm) and independently of any other autonomous entity in the swarm.

In one embodiment, the autonomous entity can be a human, a ground vehicle or other entity that can traverse terrain (e.g., a bicycle), an aerial entity, a marine entity, a submarine entity (e.g., a submarine vehicle), and a space vehicle. In one embodiment, the emitter source can be a mobile entity, a stationary entity, an intermittent entity (e.g., an entity that alternates between being stationary and mobile), and/or a multiplicity of emitter sources (e.g., the emitter source can be more than one emitter source.)

In one embodiment, the method 100 can further comprise designating as a second player, the near neighbor that is a member of the second group of near neighbors that is useful in computing the estimated location of the emitter source. That is, the autonomous entity can be considered a first player. And additionally, a member of a group of near neighbors that sends a piece of sensory information to the autonomous entity (that is, a piece of sensory information that is determined to be useful in computing an estimated location of the emitter source) can be considered a second player. The autonomous entity can perform the designating step independently of any external controlling entity (e.g., a leader that is a member of the swarm or an external member that is not a member of the swarm) and independently of any other autonomous entity in the swarm.

In one embodiment, the method 100 can comprise generating a first set of strategies. The first set of strategies can be associated with at least the first piece of sensory information. The generating can be based on game theory. The first set of strategies can comprise one strategy. The first set of strategies can comprise more than one strategy. The autonomous entity can perform the generating step independently of any external controlling entity (e.g., a leader that is a member of the swarm or an external member that is not a member of the swarm) and independently of any other autonomous entity in the swarm.

In one embodiment, the method 100 can comprise generating a second set of strategies. The second set of strategies can be associated with at least the second piece of sensory information. The generating can be based on game theory. The second set of strategies can comprise one strategy. The second set of strategies can comprise more than one strategy.

In one embodiment, the method 100 can comprise generating a first set of payoffs. The generating can be based on game theory. The first set of payoffs can be associated with at least the first set of strategies. The first set of payoffs can comprise one payoff. The first set of payoffs can comprise more than one payoff. The autonomous entity can perform the generating step independently of any external controlling entity (e.g., a leader that is a member of the swarm or an external member that is not a member of the swarm) and independently of any other autonomous entity in the swarm.

In one embodiment, the method 100 can comprise generating a second set of payoffs. The generating can be based on game theory. The second set of payoffs can be associated with at least the second set of strategies. The second set of payoffs can comprise one payoff. The second set of payoffs can comprise more than one payoff. The autonomous entity can perform the generating step independently of any external controlling entity (e.g., a leader that is a member of the swarm or an external member that is not a member of the swarm) and independently of any other autonomous entity in the swarm.

In one embodiment, the method 100 can comprise determining a set of candidate positions with respect to the estimated location of the emitter source for the autonomous entity to move. The set of candidate positions can be in a direction that is in the direction of the emitter source. The set of candidate positions can be in a direction that is opposite the direction of the emitter source. The set of candidate positions can comprise a single candidate position. The set of candidate positions can comprise more than one candidate position. The autonomous entity can perform the determining step independently of any external controlling entity (e.g., a leader that is a member of the swarm or an external member that is not a member of the swarm) and independently of any other autonomous entity in the swarm.

The determining can be accomplished by executing a biologically inspired algorithm (e.g., a genetic algorithm(s), differential evolution, grammatical evolution, artificial swarm optimization, and/or ant colony optimization). Within the realm of artificial intelligence (AI) based computation techniques, bio-inspired computation techniques (e.g., a biologically inspired algorithm) mimic evolutionary processes promoting well-adapted groups of organisms to reproduce and prevail as a population in a given environmental niche. Effective design and implementation of biologically inspired algorithms can provide suitable outcomes for problems with conflicting objectives, while involving light computational loads.

In one embodiment, the method 100 can comprise selecting a candidate position from the set of candidate positions, for the autonomous entity to move. The selecting can be accomplished using a fitness function. The fitness function can be a fitness function of the biologically inspired algorithm. A mathematical function, called fitness function, provides a numerical representation of a candidate solution's proximity to the overall optimization goal. Determining an appropriate fitness function for a problem at hand is a step that can be performed when employing a biologically inspired algorithm. The fitness of a candidate solution in a biologically inspired algorithm is indicative of its quality to be selected as the final solution. One of the embodiments of a fitness function indicates the advantageousness or suitability of each possible solution for a biologically inspired algorithm executed by an autonomous entity. For example, fitness function may reflect if a position is closer to an emitter source compared to its current position and avoids over-crowding the local vicinity while staying within the communication range of its near neighbors. The autonomous entity can perform the selecting step independently of any external controlling entity (e.g., a leader that is a member of the swarm or an external member that is not a member of the swarm) and independently of any other autonomous entity in the swarm.

In one embodiment, the method 100 can comprise moving to the candidate position selected by the fitness function. The autonomous entity can perform the moving step independently of any external controlling entity (e.g., a leader that is a member of the swarm or an external member that is not a member of the swarm) and independently of any other autonomous entity in the swarm.

In one embodiment, the method 100 can comprise actions 101-104 being performed by a second autonomous entity. In this embodiment, one can identify an estimated location of the emitter source using sensory information from the first autonomous entity and the second autonomous entity. The method 100 can comprise sending a third message. The third message can comprise a third piece of sensory information. The third message can be sent to a first group of near neighbors of the second autonomous entity. The first group of near neighbor can be located within a communication range (such as a local communication range) of the second autonomous entity. The second autonomous entity can perform this step independently of any external controlling entity (e.g., a leader that is a member of the swarm or an external member that is not a member of the swarm) and independently of any other autonomous entity in the swarm.

In one embodiment, the method 100 can comprise the second autonomous entity receiving a fourth message. The fourth message can be sent from a near neighbor (e.g., an entity that is within a communication range (e.g., a local communication range) of the second autonomous entity. The near neighbor can be a member of a second group of near neighbors of the second autonomous entity. The fourth message can comprise a fourth piece of sensory information. The second autonomous entity can receive the fourth message independently of any external controlling entity (e.g., a leader that is a member of the swarm or an external member that is not a member of the swarm) and independently of any other autonomous entity in the swarm.

In one embodiment, the method 100 can comprise determining whether the near neighbor that is a member of the second group of near neighbors of the second autonomous entity is a near neighbor that is useful in computing an estimated location of an emitter source. The determining can be accomplished using game theory. The second autonomous entity can be a third player. The near neighbor that is a useful (e.g., useful for computing an estimated location of the emitter source) member of the second group of near neighbors of the second autonomous entity, can be designated a fourth player. The determining can be performed independently of any external controlling entity (e.g., a leader that is a member of the swarm or an external member that is not a member of the swarm) and independently of any other autonomous entity in the swarm.

The identification step 104 of FIG. 1 can comprise using the third piece of sensory information and a piece of sensory information from the fourth player to estimate the location of the emitter source. Here, the fourth piece of sensory information can be from the near neighbor that is the member of the second group of near neighbors of the second autonomous entity that is useful in computing an estimated location of the emitter source. This step can be accomplished independently of any external controlling entity (e.g., a leader that is a member of the swarm or an external member that is not a member of the swarm) and independently of any other autonomous entity in the swarm.

FIG. 2a illustrates an exemplary environment 200. FIG. 2a is an exemplary representation of the environment from the perspective of an autonomous entity n1 201 that can be a member of a swarm of autonomous entities. The autonomous entity can be a human, a ground vehicle, an aerial vehicle, a marine vehicle, a submarine vehicle, a space vehicle, or other entity that is a member of a swarm. The autonomous entity can be any autonomous entity that emits a signal.

An emitter source 202 can be located within a communication range 203 of n1. The emitter source can be a mobile entity, a stationary entity, or an intermittent entity (e.g., an entity that is mobile for a first period of time and stationary for a second period of time). The emitter source can also comprise a multiplicity of emitter sources (e.g., more than one emitter source).

Autonomous entities that are within a communication range 203 of n1 201 are depicted as crosses in FIG. 2a and are labelled 208. Autonomous entities that are within a communication range of one another can be described as near neighbors. The numbers depicted in FIG. 2a next to n1 and next to the near neighbors of n1 indicate exemplary sensory information of the near neighbors (e.g., a current location of the autonomous entity, a signal strength, and/or an estimated direction of the emitter source with respect to the autonomous entity.) For example, n1 201 can receive a signal strength of 33.99 from emitter source 202 and an autonomous entity to the right of n1 can receive a signal strength of 34.44 from emitter source 202. In an exemplary embodiment of the invention, messages (e.g., a first message, a second message, a third message, and/or a fourth message) that comprise sensory information can be sent and/or received to and from autonomous entities that are near neighbors.

FIG. 2b illustrates an exemplary environment 200 comprising an autonomous entity n1 201 and near neighbors 204 (depicted with crosses) of the autonomous entity n1 201, that have been determined to be useful in computing an estimated location of the emitter source 202. In FIG. 2b, n1 201 can be considered a player. In this example, n1 201 can be considered useful in computing the estimated location of the emitter source 202. n1 201 can select a set of its near neighbors (e.g., a single near neighbor 204 or more than one near neighbor 204), that can be useful in computing the estimated location of the emitter source 202 (e.g., a three dimensional volume within which the emitter source is located). This can be accomplished using game theory. An exemplary set of near neighbors 204 that can be useful in computing the estimated location of the emitter source 202 is shown in FIG. 2b. In FIG. 2b, a set of near neighbors that is not useful in computing the estimated location of the emitter source 202 (and was previously shown in FIG. 2a) has been removed. (Note the empty cells that are not in the direction of the emitter source.)

In one embodiment, Voronoi tessellations can be employed as an estimation method to determine the estimated location of the emitter source 202. In FIG. 2b, mesh lines 207 delineate exemplary Voronoi cells around near neighbors. Voronoi tessellations is a method for dividing a space into regions, where each region is identified as having borders equidistant from its centroid. A Voronoi cell can be constructed around a near neighbor 204 of n1 201 based on the location of the near neighbor 204 such that the location of the neighbor 204 is the centroid of the cell.

In another embodiment, another estimation method or methods (e.g., heatmap computations and/or eigenspace computations) can be used as an estimation method or methods to determine an estimated location of the emitter source (e.g., a three dimensional volume within which the emitter source 202 is located).

FIG. 2c illustrates an exemplary environment 200 comprising an autonomous entity n1 201, near neighbors 204 (depicted with crosses) of the autonomous entity n1 201, where the near neighbors have been determined to be useful in computing an estimated location of an emitter source 205, and the exemplary estimated location 205 of the emitter source 202. The estimated location 205 of the emitter source 202 is depicted as a three dimensional volume in FIG. 2c, but it is to be understood by those with ordinary skill in the art that the method can be practiced in two dimensions and in three dimensions. Therefore, the emitter source 202 can be determined to be located in a two dimensional plane or a three dimensional volume.

FIG. 2d illustrates an exemplary environment 200 comprising an autonomous entity n1 201, near neighbors 204 (depicted with crosses) of the autonomous entity n1 201, where the near neighbors have been determined to be useful in computing an estimated location of an emitter source 202, and a movement direction 206 within the estimated location 205 shown in FIG. 2c. A biologically inspired algorithm can be used to compute the movement direction 206 within the estimated location 205 (as shown in FIG. 3c) of the emitter source 202.

FIG. 3a illustrates an exemplary environment 300 from the perspective of n2 301. The environment 300 comprises an autonomous entity n2 301, an emitter source 202, and an exemplary communication range 303 of n2 301. The positions of near neighbors of n2 301 are depicted as crosses in FIG. 3a and are labelled as 308. The numbers depicted in FIG. 3a next to n2 301 and next to the near neighbors 308 of n2 301 indicate exemplary sensory information (e.g., a current location of the autonomous entity, a signal strength of the emitter source received by an autonomous entity such as n2 301, a signal strength of the emitter source received by a near neighbor of n2, and/or an estimated direction of the emitter source with respect to the autonomous entity). For example, n2 301 measures signal strength received from emitter source 202 as 34.44 whereas the autonomous entity to the upper-right of n2 measures emitter source signal strength as 35.16. In an exemplary embodiment, the sensory information can be exchanged among near neighbors by means of broadcast messages.

FIG. 3b illustrates an exemplary environment 300 comprising the emitter source 202, near neighbors 304 of n2 301 that can be useful in computing an estimated location of emitter source 202, and mesh lines delineating Voronoi cells 307 around near neighbors 304 of n2 301. In FIG. 3b, n2 301 can select a set of its near neighbors 304, that will be useful in computing the estimated location of the emitter source 202. This can be accomplished using game theory.

FIG. 3c illustrates an exemplary environment 300 comprising an autonomous entity n2 301, near neighbors 204 (depicted with crosses) of the autonomous entity n1 301, where the near neighbors 204 have been determined to be useful in computing an estimated location 305 of an emitter source 202, and the exemplary estimated location 305 of the emitter source 202. The estimated location 305 of the emitter source 202 is depicted as a three dimensional volume in FIG. 3c, but it is to be understood by those with ordinary skill in the art that the method can be practiced in two dimensions and in three dimensions. Therefore, the emitter source 202 can be determined to be located in a two dimensional plane or a three dimensional volume.

FIG. 3d illustrates an exemplary environment 300 comprising an autonomous entity n2 301, near neighbors 204 (depicted with crosses) of the autonomous entity n2 201, where the near neighbors have been determined to be useful in computing an estimated location 305 (as shown in FIG. 3c) of an emitter source 202, and a movement direction 306 within the estimated location 305 shown in FIG. 3c. A biologically inspired algorithm can be used to compute the movement direction 306 within the estimated location 305 (as shown in FIG. 3c) of the emitter source 202.

Figure 4:
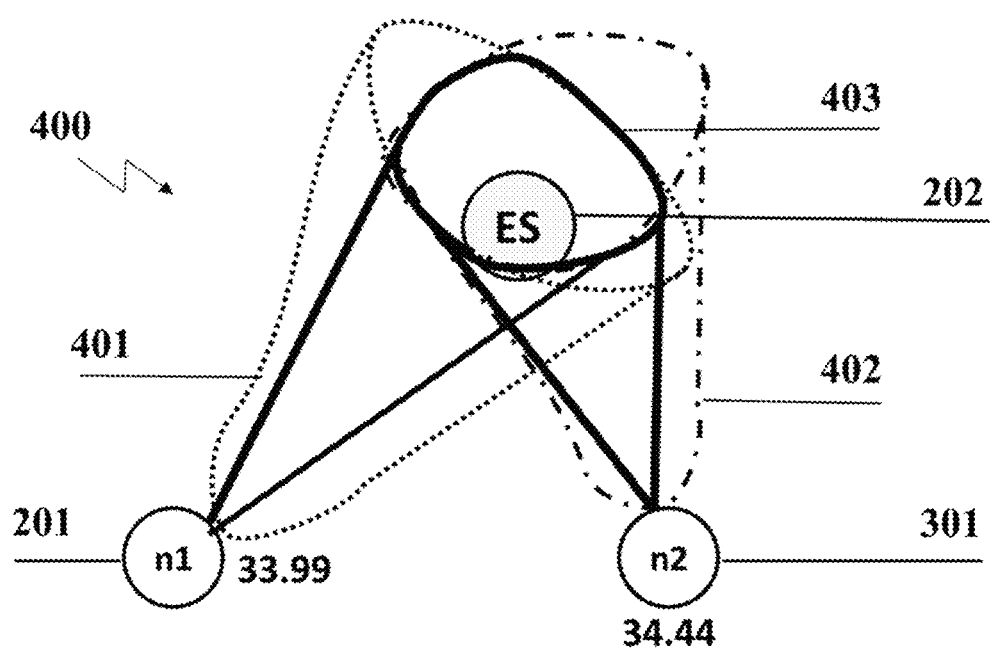
FIG. 4 is an example conceptual diagram of autonomous entities n1 and n2 computing where to move based on overlapping estimation of three dimensional volumes.

FIG. 4 illustrates an exemplary environment 400 comprising autonomous entity n1 201, autonomous entity n2 301, an estimated location 401 of the emitter source 202, as calculated from the perspective of n1 201, an estimated location 402 of the emitter source 202, as calculated from the perspective of n2 301, and a estimated location 403 that is derived from the combined result of the perspective of n1 201 and n2 301.

Figure 5:
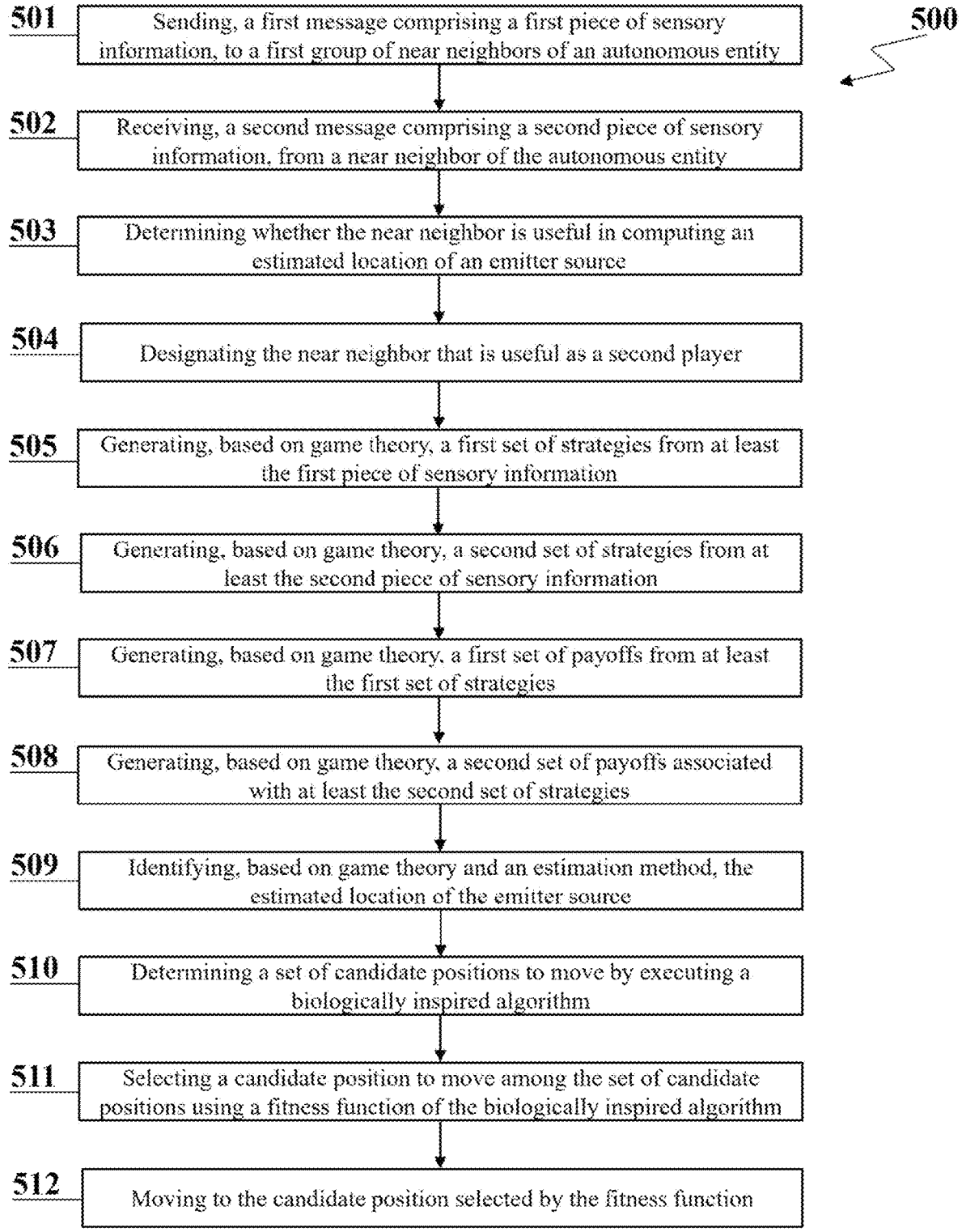
FIG. 5 illustrates a method comprising twelve actions.

FIG. 5 illustrates one embodiment of a method 500 comprising twelve actions 501-512. These actions can be performed by an autonomous entity. The autonomous entity can be a member of a swarm of autonomous entities. At 501, a first message can be sent from an autonomous entity to a first group of near neighbors of the autonomous entity. The first message can comprise a first piece of sensory information. In one embodiment, the first message can be sent at a periodic interval of time. For example, the first message can be sent every half second. In one embodiment, the first message can be sent in a single instance. In one embodiment, the first message can be sent at various intervals of time (e.g., irregularly or haphazardly). In this embodiment where the first message can be sent at various intervals of time, the first message can change as the first piece of sensory information changes. The autonomous entity can perform the sending step 501 independently of any external controlling entity (e.g., a leader that is a member of the swarm or an external member that is not a member of the swarm) and independently of any other autonomous entity in the swarm.

The first piece of sensory information can comprise at least one of a current location of the autonomous entity, a first signal strength of the emitter source, and an estimated direction of the emitter source with respect to the autonomous entity.

At 502, a second message can be received by the autonomous entity. The second message can be from a near neighbor that is a member of a second group of near neighbors of the autonomous entity. The second message can comprise a second piece of sensory information. The second message can be sent at a periodic interval of time. For example, a second message can be sent every second. The second message can be sent at a periodic interval of time that is the same as the periodic interval of time that the first message is sent. Using the example above, the second message can be sent every half second. The second message can be sent at a periodic interval of time that is different from the periodic interval of time that the first message is sent. For example, the second message can be sent every second. In one embodiment, the second message can be sent in a single instance. In one embodiment, the second message can be sent at various intervals of time (e.g., irregularly or haphazardly). In this embodiment where the second message can be sent at various intervals of time, the second message can change as the second piece of sensory information changes.

The second piece of sensory information can comprise at least one of a current location of the second near neighbor of the autonomous entity, a second signal strength of the emitter source, and an estimated direction of the emitter source with respect to the second near neighbor. The second near neighbor can be a near neighbor that is the member of the second group of near neighbors of the autonomous entity. The autonomous entity can perform the receiving step 502 independently of any external controlling entity (e.g., a leader that is a member of the swarm or an external member that is not a member of the swarm) and independently of any other autonomous entity in the swarm.

At 503, a determination on whether the near neighbor that is a member of the second group of near neighbors, is a near neighbor that is useful in computing an estimated location of an emitter source, can be performed. The determination can be performed using game theory. Game theory is described in paragraph [025]. The autonomous entity can be a first player. The autonomous entity can perform the determination 503 of whether the near neighbor that is a member of the second group of near neighbors is a near neighbor that is useful, independently of any external controlling entity (e.g., a leader that is a member of the swarm or an external member that is not a member of the swarm) and independently of any other autonomous entity in the swarm.

At 504, if the near neighbor that is a member of the second group of near neighbors is a near neighbor that is useful in computing an estimated location of an emitter source, the near neighbor that is the member of the second group of near neighbors that is useful in computing an estimated location of the emitter source can be designated as a second player. The autonomous entity can designate 504 the near neighbor that is the member of the second group of near neighbors that is useful in computing an estimated location of the emitter source as a second player, independently of any external controlling entity (e.g., a leader that is a member of the swarm or an external member that is not a member of the swarm) and independently of any other autonomous entity in the swarm.

At 505, a first set of strategies can be generated. This can be accomplished based on game theory. The first set of strategies can be generated from at least the first piece of sensory information. The first set of strategies can exclude poor quality pieces of sensory information in favor of good quality pieces of sensory information. For example, they can eliminate a piece of sensory of information (e.g., the first piece of sensory information, the second piece of sensory information, and/or additional pieces of sensory information) that is weak or that is not recent (e.g., a piece of sensory message that was sent in a previous iteration of the method). Elimination of poor quality pieces of sensory information can render the computations more computationally efficient and the computations can be performed more quickly. This can lead to more accurate geolocation of the emitter source, since the emitter source can change location as time progresses. The autonomous entity can generate 505 the first set of strategies independently of any external controlling entity (e.g., a leader that is a member of the swarm or an external member that is not a member of the swarm) and independently of any other autonomous entity in the swarm.

At 506, a second set of strategies can be generated. This can be accomplished based on game theory. The second set of strategies can be generated from at least the second piece of sensory information from the second player. The autonomous entity can generate 506 the second set of strategies independently of any external controlling entity (e.g., a leader that is a member of the swarm or an external member that is not a member of the swarm) and independently of any other autonomous entity in the swarm.

At 507, based on game theory, a first set of payoffs can be generated and be associated with at least the first set of strategies. The autonomous entity can generate 507 the first set of payoffs independently of any external controlling entity (e.g., a leader that is a member of the swarm or an external member that is not a member of the swarm) and independently of any other autonomous entity in the swarm.

At 508, a second payoff can be generated from at least the second set of strategies. This can be accomplished based on game theory. The autonomous entity can generate 508 the second set of payoffs independently of any external controlling entity (e.g., a leader that is a member of the swarm or an external member that is not a member of the swarm) and independently of any other autonomous entity in the swarm.

At 509, an estimated location (e.g., a two dimensional area or a three dimensional volume) of the emitter source can be identified. This can be performed by using at least the first payoff and the second payoff. This can be accomplished using game theory and an estimation method. Suitable estimation methods include, but are not limited to, Voronoi tessellations, heatmap computations, and eigenspace computations. The autonomous entity can identify 509 the estimated location of the emitter source independently of any external controlling entity (e.g., a leader that is a member of the swarm or an external member that is not a member of the swarm) and independently of any other autonomous entity in the swarm.

At 510, a set of candidate positions can be determined for the autonomous entity to move with respect to the estimated location of the emitter source (e.g., the three dimensional volume or two dimensional area). For example, a set of candidate positions can be determined for the autonomous entity to move toward. A set of candidate positions can be determined for the autonomous entity to move away from. A set of candidate positions can comprise a single candidate position. A set of candidate positions can comprise more than one candidate position. The determination of the set of candidate positions can be accomplished by executing a biologically inspired algorithm. Suitable biologically inspired algorithms include, but are not limited to genetic algorithms, differential evolution, grammatical evolution, artificial swarm optimization, and ant colony optimization.

The autonomous entity can determine 510 the set of candidate positions for the autonomous entity to move, independently of any external controlling entity (e.g., a leader that is a member of the swarm or an external member that is not a member of the swarm) and independently of any other autonomous entity in the swarm.

At 511, a candidate position from the set of candidate positions can be selected to move to or away from. This can be accomplished by using a fitness function of the biologically inspired algorithm. The autonomous entity can select the candidate position to move, independently of any external controlling entity (e.g., a leader that is a member of the swarm or an external member that is not a member of the swarm) and independently of any other autonomous entity in the swarm.

At 512, the autonomous entity can move to the candidate position (e.g., a candidate position that is located within a three dimensional volume or a candidate position that is located within a two dimensional area). In this embodiment, where the autonomous entity can move to a candidate position within the three dimensional volume, one may wish to move toward an emitter source.

Alternatively, the candidate position can be located opposite the three dimensional volume. In this example, it can be beneficial for the swarm to move in a direction opposite the emitter source (e.g., a direction opposite the emitter source, a direction opposite the two dimensional area within which the emitter source is estimated to be located, or a direction opposite the three dimensional volume within which the emitter source is estimated to be located). For example, it can be beneficial for the swarm to move away from a signal jammer. It can also be beneficial for the swarm to move away from an emitter source that is an emission of toxic gas. The autonomous entity can move 512 in a direction toward, and move in a direction opposite, the position selected by the fitness function, independently of any external controlling entity (e.g., a leader that is a member of the swarm or an external member that is not a member of the swarm) and independently of any other autonomous entity in the swarm.

In one embodiment of the method 500, the method 500 can further comprise sending, by a second autonomous entity in the swarm of autonomous entities, a third message to a first group of near neighbors of the second autonomous entity. The third message can comprise a third piece of sensory information. The second autonomous entity can be within a communication range of the first group of near neighbors of the second autonomous entity. The autonomous entity can perform the sending step independently of any external controlling entity (e.g., a leader that is a member of the swarm or an external member that is not a member of the swarm) and independently of any other autonomous entity in the swarm.

In this embodiment, the method 500 can further comprise receiving, by the second autonomous entity, a fourth message. The fourth message can comprise a fourth piece of sensory information from a near neighbor that is a member of a second group of near neighbors of the second autonomous entity. The near neighbor that is a member of a second group of near neighbors of the second autonomous entity can be within a communication range of the second autonomous entity. The autonomous entity can perform the receiving step independently of any external controlling entity (e.g., a leader that is a member of the swarm or an external member that is not a member of the swarm) and independently of any other autonomous entity in the swarm.

The method 500 can further comprise determining whether the near neighbor that is a member of the second group of near neighbors of the second autonomous entity, is a near neighbor that is useful in computing an estimated location of an emitter source. The determining can be accomplished using game theory. If the near neighbor that is a member of the second group of near neighbors of the second autonomous entity is a near neighbor that is useful in computing an estimated location of the emitter source, then the near neighbor that is useful can be designated as a fourth player. The determination step can be accomplished independently of any external controlling entity (e.g., a leader that is a member of the swarm or an external member that is not a member of the swarm) and independently of any other autonomous entity in the swarm.

The method 500 can further comprise generating a third set of strategies associated with at least the third piece of sensory information. This can be accomplished using game theory. The third set of strategies can comprise one or more strategies. The second autonomous entity can generate the third set of strategies independently of any external controlling entity (e.g., a leader that is a member of the swarm or an external member that is not a member of the swarm) and independently of any other autonomous entity in the swarm.

The method 500 can further comprise generating a fourth set of strategies associated with at least a fourth piece of sensory information from the fourth player. (Here, the fourth piece of sensory information is from the fourth player. In this case, the member of the second group of near neighbors of the second autonomous entity is determined to be useful in computing an estimated location of the emitter source.) This can be accomplished using game theory. The fourth set of strategies can comprise one or more strategies. The second autonomous entity can generate the fourth set of strategies independently of any external controlling entity (e.g., a leader that is a member of the swarm or an external member that is not a member of the swarm) and independently of any other autonomous entity in the swarm.

The method 500 can further comprise generating a third set of payoffs from at least the third set of strategies. This can be accomplished using game theory. The third set of payoffs can comprise one or more payoffs. The generating the third set of payoffs can be performed by the second autonomous entity. The second autonomous entity can generate the third set of payoffs independently of any external controlling entity (e.g., a leader that is a member of the swarm or an external member that is not a member of the swarm) and independently of any other autonomous entity in the swarm.

The method 500 can further comprise generating a fourth set of payoffs from at least the fourth set of strategies. This can be accomplished using game theory. The fourth set of payoffs can comprise one or more payoffs. The generating the fourth set of payoffs can be performed by the second autonomous entity. The second autonomous entity can generate the fourth set of payoffs independently of any external controlling entity (e.g., a leader that is a member of the swarm or an external member that is not a member of the swarm) and independently of any other autonomous entity in the swarm.

The method 500 can further comprise identifying an estimated location (e.g., a two dimensional plane or a three dimensional volume) of the emitter source, using at least the first payoff, the second payoff, the third payoff, and the fourth payoff. This can be accomplished based on game theory and an estimation method. The second autonomous entity can identify the estimated location of the emitter source independently of any external controlling entity (e.g., a leader that is a member of the swarm or an external member that is not a member of the swarm) and independently of any other autonomous entity in the swarm.

The method 500 can further comprise determining a second set of candidate positions with respect to the estimated location (e.g., a two dimensional plane or a three dimensional volume) of the emitter source for the second autonomous entity to move. This can be accomplished by executing a biologically inspired algorithm. The second autonomous entity can determine the set of candidate positions for the second autonomous entity to move, independently of any external controlling entity (e.g., a leader that is a member of the swarm or an external member that is not a member of the swarm) and independently of any other autonomous entity in the swarm.

The method 500 can further comprise selecting a position for the second autonomous entity to move among the second set of candidate positions. This can be accomplished using a fitness function of the biologically inspired algorithm. The second autonomous entity can select the candidate position to move toward or away from, independently of any external controlling entity (e.g., a leader that is a member of the swarm or an external member that is not a member of the swarm) and independently of any other autonomous entity in the swarm.

The method 500 can further comprise moving by the second autonomous entity. The moving can be toward the selected position or the moving can be in a direction opposite the selected position. The second autonomous entity can move in a direction toward, and move in a direction opposite, the position selected by the fitness function, independently of any external controlling entity (e.g., a leader that is a member of the swarm or an external member that is not a member of the swarm) and independently of any other autonomous entity in the swarm.

In another embodiment, a non-transitory computer-readable storage medium can be configured for store a program. The program can perform the aforementioned method or methods (e.g., the method 100 of FIG. 1, the method 500 of FIG. 5, or any embodiment of those methods). In yet another embodiment, a system can comprise a swarm of autonomous entities (e.g., a plurality of autonomous entities) and a control unit that can perform the aforementioned method or methods (e.g., the method 100 of FIG. 1, the method 500 of FIG. 5, or any embodiment of those methods).

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action (s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

What is claimed is:

1. A method, the method comprising:
   sending a first message comprising a first piece of sensory information from an autonomous entity, that is a member of a swarm of autonomous entities, to a first group of near neighbors of the autonomous entity;
   receiving, by the autonomous entity, a second message comprising a second piece of sensory information from a near neighbor that is a member of a second group of near neighbors of the autonomous entity;
   determining, based on game theory, whether the near neighbor that is a member of the second group of near neighbors, is a near neighbor that is useful in computing an estimated location of an emitter source; and
   identifying the estimated location of the emitter source, based on game theory and an estimation method and using at least the first piece of sensory information and a second piece of sensory information from the near neighbor that is useful in computing the estimated location of the emitter source,
   wherein the autonomous entity performs the sending, the receiving, the determining, and the identifying, independently of an external controlling entity,
   wherein the autonomous entity performs the sending, the receiving, the determining, and the identifying, independently of any other autonomous entity in the swarm,
   wherein the first group of near neighbors of the autonomous entity is located within a local communication range of the autonomous entity, and
   wherein the second group of near neighbors of the autonomous entity is located within the local communication range of the autonomous entity.

2. The method of claim 1, further comprising:
   designating the near neighbor that is the member of the second group of near neighbors that is useful in computing the estimated location of the emitter source as a second player;
   generating, based on game theory, a first set of strategies associated with at least the first piece of sensory information;
   generating, based on game theory, a second set of strategies associated with at least a second piece of sensory information from the second player;
   generating, based on game theory, a first set of payoffs associated with at least the first set of strategies;
   generating, based on game theory, a second set of payoffs associated with at least the second set of strategies;
   determining a set of candidate positions with respect to the estimated location of the emitter source for the autonomous entity to move by executing a biologically inspired algorithm;
   selecting a candidate position to move to from the set of candidate positions using a fitness function of the biologically inspired algorithm; and
   moving to the candidate position selected by the fitness function,
   wherein the autonomous entity performs, independently of an external controlling entity, the designating, the generating the first set of strategies, the generating the second set of strategies, the generating the first set of payoffs, the generating the second set of payoffs, the determining the set of candidate positions, the selecting, and the moving,
   wherein the autonomous entity performs, independently of any other member of the swarm of autonomous entities, the designating, the generating the first set of strategies, the generating the second set of strategies, the generating the first set of payoffs, the generating the second set of payoffs, the determining the set of candidate positions, the selecting, and the moving,
   wherein the first set of payoffs comprises at least one payoff, the second set of payoffs comprises at least one payoff, the first set of strategies comprises at least one strategy, the second set of strategies comprises at least one strategy, and wherein the set of candidate positions comprises at least one candidate position.

3. The method of claim 1, further comprising:
   sending, by a second autonomous entity in the swarm of autonomous entities, a third message comprising a third piece of sensory information to a first group of near neighbors of the second autonomous entity;
   receiving, by the second autonomous entity, a fourth message comprising a fourth piece of sensory information from a near neighbor that is a member of a second group of near neighbors of the second autonomous entity; and
   determining, based on game theory, whether the near neighbor that is a member of the second group of near neighbors of the second autonomous entity, is a near neighbor that is useful in computing the estimated location of an emitter source,
   wherein the identifying the estimated location of the emitter source further comprises using the third piece of sensory information and a fourth piece of sensory information from the near neighbor that is the member of the second group of near neighbors of the second autonomous entity that is useful in computing the estimated location of the emitter source, wherein the second autonomous entity performs the sending, the receiving, the determining, and the identifying, independently of an external controlling entity, wherein the second autonomous entity performs the sending, the receiving, the determining, and the identifying, independently of any other autonomous entity in the swarm, wherein the first group of near neighbors of the second autonomous entity is located within a local communication range of the autonomous entity, and wherein the second group of near neighbors of the second autonomous entity is located within the local communication range of the autonomous entity.

4. The method of claim 1, wherein the autonomous entity is an autonomous entity that is selected from a group consisting of a human, a ground vehicle, an aerial entity, a marine entity, a submarine vehicle, and a space vehicle and wherein the emitter source is an emitter source that is selected from a group consisting of a mobile entity, a stationary entity, an intermittent entity, and a multiplicity of emitter sources, the multiplicity of emitter sources comprising at least two emitter sources.

5. The method of claim 1, wherein the first piece of sensory information comprises at least one of a current location of the autonomous entity, a first signal strength of the emitter source, and an estimated direction of the emitter source with respect to the autonomous entity and wherein the second piece of sensory information comprises at least one of a current location of the near neighbor that is the member of the second group of near neighbors of the autonomous entity, a second signal strength of the emitter source, and an estimated direction of the emitter source with respect to the member of the second group of near neighbors.

6. The method of claim 1, wherein the first piece of sensory information comprises at least one of an amount of heat, a frequency of an electromagnetic wave, a strength of an acoustic signal, a concentration of a gas, a concentration of a liquid, and a visual indicator and wherein the second piece of sensory information comprises at least one of an amount of heat, a frequency of an electromagnetic wave, a strength of an acoustic signal, a concentration of a gas, a concentration of a liquid, and a visual indicator.

7. The method of claim 1, wherein the estimation method is selected from a group consisting of Voronoi tessellations, heatmap computations, and eigenspace computations and wherein the biologically inspired algorithm employs a methodology that is selected from a group consisting of genetic algorithms, differential evolution, grammatical evolution, artificial swarm optimization, and ant colony optimization.

8. A non-transitory computer-readable storage medium configured to store a program, the program comprising:

sending a first message comprising a first piece of sensory information from an autonomous entity, that is a member of a swarm of autonomous entities, to a first group of near neighbors of the autonomous entity;

receiving, by the autonomous entity, a second message comprising a second piece of sensory information from a near neighbor that is a member of a second group of near neighbors of the autonomous entity;

determining, based on game theory, whether the near neighbor that is a member of the second group of near neighbors, is a near neighbor that is useful in computing an estimated location of an emitter source; and identifying the estimated location of the emitter source, based on game theory and an estimation method and using at least the first piece of sensory information and a second piece of sensory information from the near neighbor that is useful in computing the estimated location of the emitter source, wherein the autonomous entity performs the sending, the receiving, the determining, and the identifying, independently of an external controlling entity, wherein the autonomous entity performs the sending, the receiving, the determining, and the identifying, independently of any other autonomous entity in the swarm, wherein the first group of near neighbors of the autonomous entity is located within a local communication range of the autonomous entity, and wherein the second group of near neighbors of the autonomous entity is located within the local communication range of the autonomous entity.

9. The non-transitory computer-readable storage medium according to claim 8, the program further comprising:

designating the near neighbor that is the member of the second group of near neighbors that is useful in computing the estimated location of the emitter source as a second player;

generating, based on game theory, a first set of strategies associated with at least the first piece of sensory information;

generating, based on game theory, a second set of strategies associated with at least a second piece of sensory information from the second player;

generating, based on game theory, a first set of payoffs associated with at least the first set of strategies;

generating, based on game theory, a second set of payoffs associated with at least the second set of strategies;

determining a set of candidate positions with respect to the estimated location of the emitter source for the autonomous entity to move by executing a biologically inspired algorithm;

selecting a candidate position to move to from the set of candidate positions using a fitness function of the biologically inspired algorithm; and moving to the candidate position selected by the fitness function, wherein the autonomous entity performs, independently of an external controlling entity, the designating, the generating the first set of strategies, the generating the second set of strategies, the generating the first set of payoffs, the generating the second set of payoffs, the determining the set of candidate positions, the selecting, and the moving, wherein the autonomous entity performs, independently of any other member of the swarm of autonomous entities, the designating, the generating the first set of strategies, the generating the second set of strategies, the generating the first set of payoffs, the generating the second set of payoffs, the determining the set of candidate positions, the selecting, and the moving, wherein the first set of payoffs comprises at least one payoff, the second set of payoffs comprises at least one payoff, the first set of strategies comprises at least one strategy, the second set of strategies comprises at least one strategy, and wherein the set of candidate positions comprises at least one candidate position.

10. The non-transitory computer-readable storage medium according to claim 8, the program further comprising:
sending, by a second autonomous entity in the swarm of autonomous entities, a third message comprising a third piece of sensory information to a first group of near neighbors of the second autonomous entity;
receiving, by the second autonomous entity, a fourth message comprising a fourth piece of sensory information from a near neighbor that is a member of a second group of near neighbors of the second autonomous entity; and
determining, based on game theory, whether the near neighbor that is a member of the second group of near neighbors of the second autonomous entity, is a near neighbor that is useful in computing the estimated location of an emitter source,
wherein the identifying the estimated location of the emitter source further comprises using the third piece of sensory information and a fourth piece of sensory information from the near neighbor that is the member of the second group of near neighbors of the second autonomous entity that is useful in computing the estimated location of the emitter source,
wherein the second autonomous entity performs the sending, the receiving, the determining, and the identifying, independently of an external controlling entity,
wherein the second autonomous entity performs the sending, the receiving, the determining, and the identifying, independently of any other autonomous entity in the swarm,
wherein the first group of near neighbors of the second autonomous entity is located within a local communication range of the autonomous entity, and
wherein the second group of near neighbors of the second autonomous entity is located within the local communication range of the autonomous entity.

11. The non-transitory computer-readable storage medium according to claim 8,
wherein the autonomous entity is an autonomous entity that is selected from a group consisting of a human, a ground vehicle, an aerial entity, a marine entity, a submarine vehicle, and a space vehicle and
wherein the emitter source is an emitter source that is selected from a group consisting of a mobile entity, a stationary entity, an intermittent entity, and a multiplicity of emitter sources, the multiplicity of emitter sources comprising at least two emitter sources.

12. The non-transitory computer-readable storage medium according to claim 8,
wherein the first piece of sensory information comprises at least one of a current location of the autonomous entity, a first signal strength of the emitter source, and an estimated direction of the emitter source with respect to the autonomous entity and
wherein the second piece of sensory information comprises at least one of a current location of the near neighbor that is the member of the second group of near neighbors of the autonomous entity, a second signal strength of the emitter source, and an estimated direction of the emitter source with respect to the member of the second group of near neighbors.

13. The non-transitory computer-readable storage medium according to claim 8,
wherein the first piece of sensory information comprises at least one of an amount of heat, a frequency of an electromagnetic wave, a strength of an acoustic signal, a concentration of a gas, a concentration of a liquid, and a visual indicator and
wherein the second piece of sensory information comprises at least one of an amount of heat, a frequency of an electromagnetic wave, a strength of an acoustic signal, a concentration of a gas, a concentration of a liquid, and a visual indicator.

14. The non-transitory computer-readable storage medium according to claim 8,
wherein the estimation method is selected from a group consisting of Voronoi tessellations, heatmap computations, and eigenspace computations and
wherein the biologically inspired algorithm employs a methodology that is selected from a group consisting of genetic algorithms, differential evolution, grammatical evolution, artificial swarm optimization, and ant colony optimization.

15. A system, the system comprising:
a swarm of autonomous entities, the swarm comprising a plurality of autonomous entities;
a control unit configured to perform actions, the actions comprising:
sending a first message comprising a first piece of sensory information from an autonomous entity, that is a member of a swarm of autonomous entities, to a first group of near neighbors of the autonomous entity;
receiving, by the autonomous entity, a second message comprising a second piece of sensory information from a near neighbor that is a member of a second group of near neighbors of the autonomous entity;
determining, based on game theory, whether the near neighbor that is a member of the second group of near neighbors, is a near neighbor that is useful in computing an estimated location of an emitter source; and
identifying an estimated location of the emitter source, based on game theory and an estimation method and using at least the first piece of sensory information and a second piece of sensory information from the near neighbor that is useful in computing the estimated location of the emitter source,
wherein the autonomous entity performs the sending, the receiving, the determining, and the identifying, independently of an external controlling entity,
wherein the autonomous entity performs the sending, the receiving, the determining, and the identifying, independently of any other autonomous entity in the swarm,
wherein the first group of near neighbors of the autonomous entity is located within a local communication range of the autonomous entity, and
wherein the second group of near neighbors of the autonomous entity is located within the local communication range of the autonomous entity.

16. The system of claim 15, wherein the actions further comprise:
designating the near neighbor that is the member of the second group of near neighbors that is useful in computing the estimated location of the emitter source as a second player;
generating, based on game theory, a first set of strategies associated with at least the first piece of sensory information;

generating, based on game theory, a second set of strategies associated with at least a second piece of sensory information from the second player;

generating, based on game theory, a first set of payoffs associated with at least the first set of strategies;

generating, based on game theory, a second set of payoffs associated with at least the second set of strategies;

determining a set of candidate positions with respect to the estimated location of the emitter source for the autonomous entity to move by executing a biologically inspired algorithm;

selecting a candidate position to move to from the set of candidate positions using a fitness function of the biologically inspired algorithm; and moving to the candidate position selected by the fitness function, wherein the autonomous entity performs, independently of an external controlling entity, the designating, the generating the first set of strategies, the generating the second set of strategies, the generating the first set of payoffs, the generating the second set of payoffs, the determining the set of candidate positions, the selecting, and the moving, wherein the autonomous entity performs, independently of any other member of the swarm of autonomous entities, the designating, the generating the first set of strategies, the generating the second set of strategies, the generating the first set of payoffs, the generating the second set of payoffs, the determining the set of candidate positions, the selecting, and the moving, wherein the first set of payoffs comprises at least one payoff, the second set of payoffs comprises at least one payoff, the first set of strategies comprises at least one strategy, the second set of strategies comprises at least one strategy, and wherein the set of candidate positions comprises at least one candidate position.

17. The system of claim 15, wherein the actions further comprise:

sending, by a second autonomous entity in the swarm of autonomous entities, a third message comprising a third piece of sensory information to a first group of near neighbors of the second autonomous entity;

receiving, by the second autonomous entity, a fourth message comprising a fourth piece of sensory information from a near neighbor that is a member of a second group of near neighbors of the second autonomous entity; and determining, based on game theory, whether the near neighbor that is a member of the second group of near neighbors of the second autonomous entity, is a near neighbor that is useful in computing an estimated location of an emitter source, wherein the identifying the estimated location of the emitter source further comprises using the third piece of sensory information and a fourth piece of sensory information from the near neighbor that is the member of the second group of near neighbors of the second autonomous entity that is useful in computing an estimated location of the emitter source, wherein the second autonomous entity performs the sending, the receiving, the determining, and the identifying, independently of an external controlling entity, wherein the second autonomous entity performs the sending, the receiving, the determining, and the identifying, independently of any other autonomous entity in the swarm, wherein the first group of near neighbors of the second autonomous entity is located within a local communication range of the autonomous entity, and wherein the second group of near neighbors of the second autonomous entity is located within the local communication range of the autonomous entity.

18. The system of claim 15, wherein the autonomous entity is an autonomous entity that is selected from a group consisting of a human, a ground vehicle, an aerial entity, a marine entity, a submarine vehicle, and a space vehicle and wherein the emitter source is an emitter source that is selected from a group consisting of a mobile entity, a stationary entity, an intermittent entity, and a multiplicity of emitter sources, the multiplicity of emitter sources comprising at least two emitter sources.

19. The system of claim 15, wherein the first piece of sensory information comprises at least one of a current location of the autonomous entity, a first signal strength of the emitter source, and an estimated direction of the emitter source with respect to the autonomous entity and wherein the second piece of sensory information comprises at least one of a current location of the near neighbor that is the member of the second group of near neighbors of the autonomous entity, a second signal strength of the emitter source, and an estimated direction of the emitter source with respect to the near neighbor that is the member of the second group of near neighbors of the autonomous entity.

20. The system of claim 15, wherein the first piece of sensory information comprises at least one of an amount of heat, a frequency of an electromagnetic wave, a strength of an acoustic signal, a concentration of a gas, a concentration of a liquid, and a visual indicator and wherein the second piece of sensory information comprises at least one of an amount of heat, a frequency of an electromagnetic wave, a strength of an acoustic signal, a concentration of a gas, a concentration of a liquid, and a visual indicator.

\* \* \* \* \*